Oct. 18, 1932.  A. P. BALL  1,883,464

VENTILATOR CONSTRUCTION

Filed Jan. 8, 1932  2 Sheets-Sheet 1

INVENTOR
Albert P. Ball
BY
ATTORNEYS

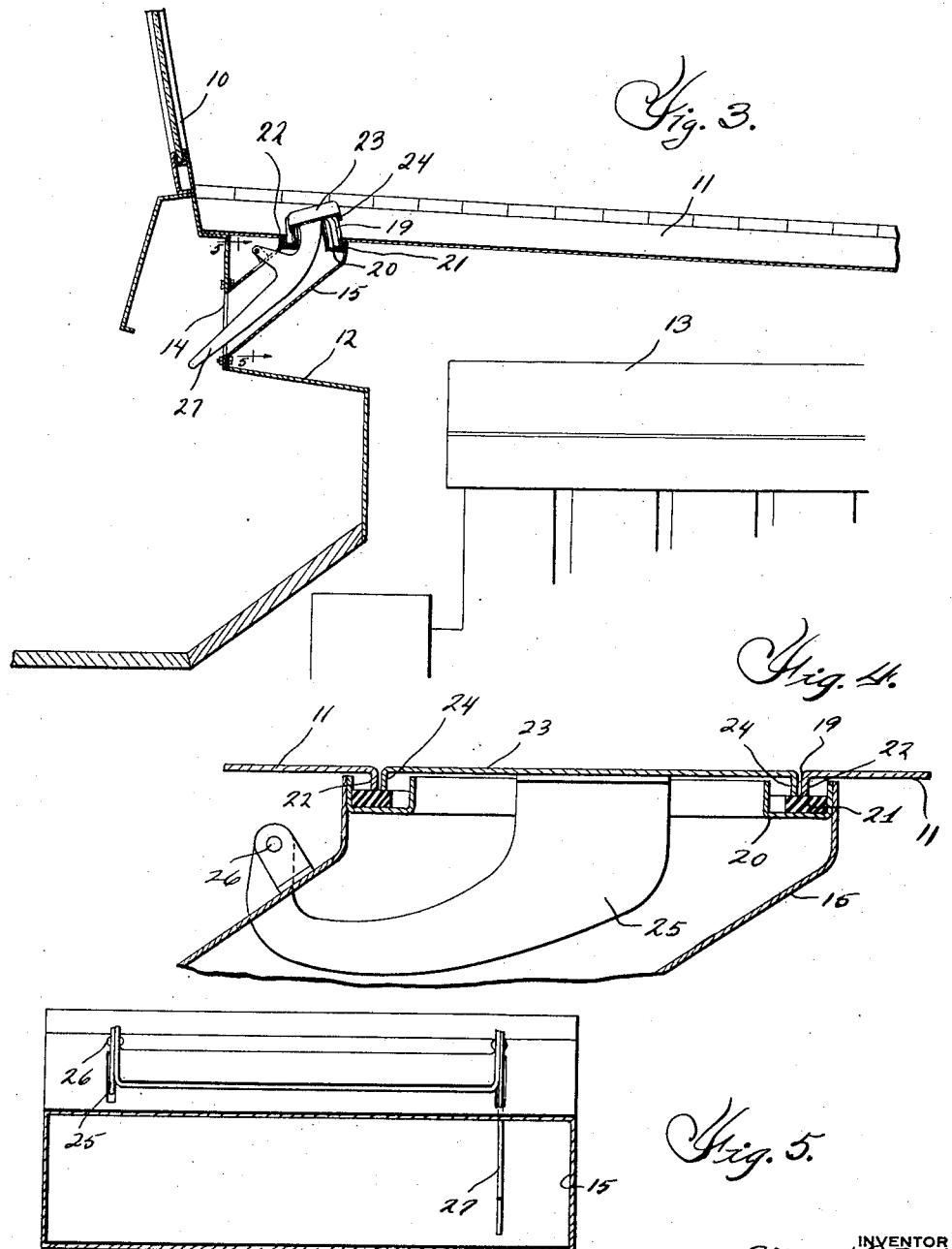

Patented Oct. 18, 1932

REISSUED 1,883,464

UNITED STATES PATENT OFFICE

ALBERT P. BALL, OF DETROIT, MICHIGAN, ASSIGNOR TO BRIGGS MANUFACTURING COMPANY, OF DETROIT, MICHIGAN, A CORPORATION OF MICHIGAN

VENTILATOR CONSTRUCTION

Application filed January 8, 1932. Serial No. 585,606.

This invention relates to a ventilator construction and more especially to a ventilator for use in motor vehicles and the like.

The invention finds particular utility in connection with motor vehicles in which the cowl is eliminated and in which the hood extends back to the windshield.

Ordinarily, the so-called cowl ventilators for motor vehicles are connected permanently to the cowl of the vehicle and an opening is cut in the cowl in registration with the ventilator opening. However, in constructions in which the cowl is eliminated, the ventilator cannot be permanently attached or in anywise connected to the hood because the sections of the hood are movable so that access may be had to the engine.

It is therefore one of the important objects of this invention to provide a ventilator structure which is mounted on a fixed portion of the vehicle, separate from the hood sections so that the hood sections may each be operated without interference from the ventilator. The structure also contemplates an arrangement wherein the forward end of the ventilator is in registration with the opening in the hood when the latter is closed, the ventilator being controlled by a closure which, in its closed position, is located in the plane of the hood opening and, to all appearances, forms a continuation of the hood.

The several objects, advantages and novel details of construction of the invention will be made more apparent as this description proceeds, especially when considered in connection with the accompanying drawings, wherein Figure 1 is a fragmentary perspective view of a portion of a motor vehicle, having a ventilator constructed in accordance with my invention;

Figure 3 is a fragmentary longitudinal sectional elevational view of a motor vehicle showing the ventilator structure;

Figure 4 is an enlarged sectional view through the closure end of the ventilator, and Figure 5 is an enlarged sectional view taken substantially on a plane indicated by line 5—5 in Figure 3.

Figure 1:
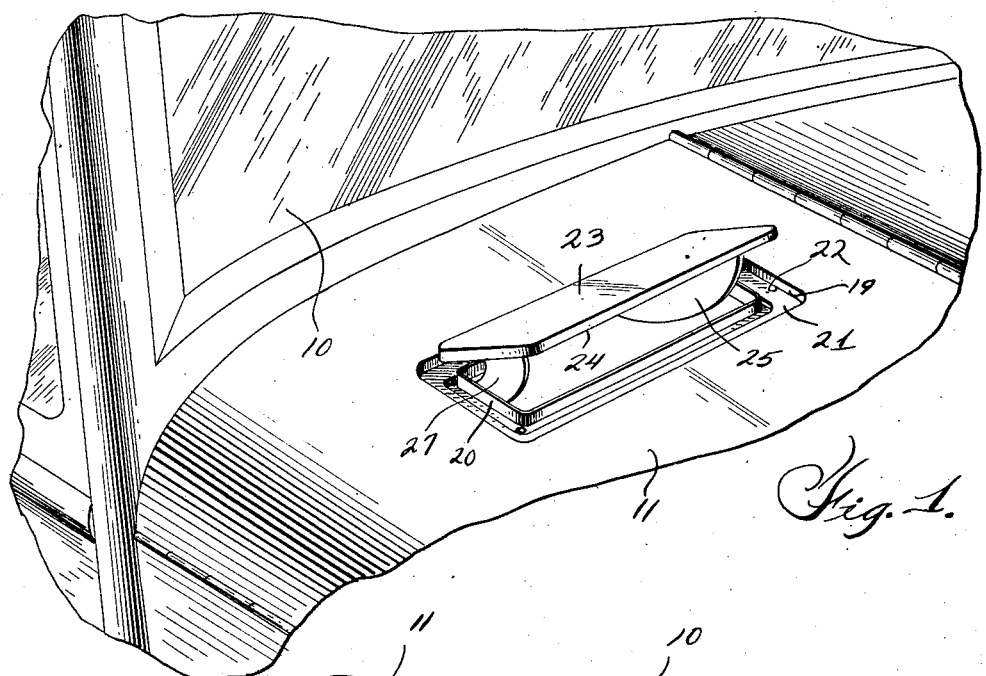
Figure 2:
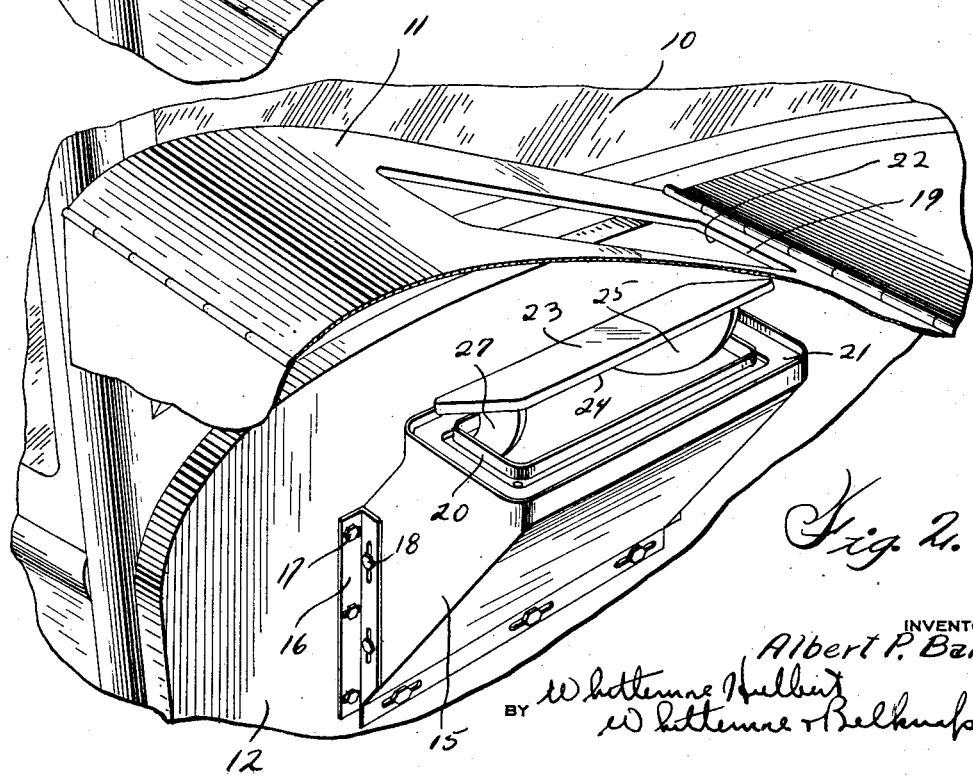
Figure 2 is a similar view with the hood section partially raised.

Referring now more particularly to the drawings wherein like reference characters indicate like parts, it will be noted that there is illustrated fragmentarily, the windshield 10, hood 11, dash 12, and motor 13 of a motor vehicle. It will be noted that the hood extends rearwardly to the windshield, thereby eliminating the customary cowl. The dash 12 is provided with an opening 14 and secured to the dash, in registration with this opening 14, is a ventilator conduit 15. While any preferred or desired means may be provided for attaching the conduit to the dash, I have provided angle members 16, one flange of each of which is secured by bolt and slot connections 17 to the dash, whereas the other flange of each is secured by bolt and slot connections 18 with the conduit. The slots extend in opposite directions so that a substantial universal adjustment of the conduit with respect to the dash, is possible.

The conduit 15 extends upwardly into registration with an opening 19 in the hood section 11, and it is for the purpose of providing for an alignment of the upper end of the conduit with the opening 19 that the universal mounting aforesaid of the conduit, is provided.

As seen most clearly in Figure 4, the upper end of the conduit 14 is provided with a U-shaped channel member 20 around the periphery thereof, in which a resilient pad or the like 21, is located. The opening 19 in the hood section 11 is provided peripherally thereof with a downwardly extending flange 22 which enters the U-shaped channel 20 in the closed position of the hood section and engages the pad 21 to provide a substantially weatherproof joint.

The upper or open end of the ventilator conduit is adapted to be closed by a closure member 23, also provided with a peripherally down turned flange 24 which, in the closed position of the closure, engages the pad 21 to provide a weatherproof seal for the closure.

The closure 23 may be, and preferably is, hingedly supported by the customary hinge members 25, pivotally mounted at 26 and the closure is operated by means of an operating lever 27.

It will be seen that when the hood section 11 is closed and when the closure 23 is in its shut position, this latter closure lies in the same general plane as the opening 19 in the hood section and to all appearances forms a continuation of the hood section.

However, the closure 23 may be opened to permit air to flow through the conduit 15 and through the opening 14 of the dash and thus into the interior of the vehicle. Moreover, the hood section 11 may be opened without interference from the ventilator as the latter is mounted entirely independently thereof.

Obvious modifications may suggest themselves to those skilled in this art and to this end reservation is made to make such changes as may come within the purview of the accompanying claims.

What I claim as my invention is:

1. In a vehicle body in which the hood extends rearwardly to a point adjacent the windshield, the combination of a movable hood section having an opening therein, a dash, and a ventilator conduit secured to said dash and extending under said hood section and into registration with said opening when the hood section is closed.

2. In a vehicle body in which the hood extends rearwardly to a point adjacent the windshield, the combination of a movable hood section having an opening therein, a dash, a ventilator conduit secured to said dash and extending under said hood section into registration with said opening when the hood section is closed, and means for adjustably securing said conduit to said dash.

3. In a vehicle body in which the hood extends rearwardly to a point adjacent the windshield, the combination of a movable hood section having an opening therein, a dash, a ventilator conduit secured to said dash and extending under said hood section into registration with said opening when the hood section is closed, and a closure for said conduit located in the plane of the hood opening when the hood is in closed position.

4. In a vehicle body, a dash having a ventilator conduit connected thereto, a hood member having an opening therein registering with the upper end of said conduit, and a closure for said conduit located in the plane of the hood opening when the hood is in closed position.

5. In a vehicle body, a hood member provided with an opening therein, a dash provided with an opening therethrough, a conduit secured to said dash and extending from the opening therein to the hood opening, and a closure for said conduit located in the opening of the hood when the latter is in closed position.

In testimony whereof I affix my signature.

ALBERT P. BALL.